(12) United States Patent
Baumann et al.

(10) Patent No.: US 7,385,964 B2
(45) Date of Patent: Jun. 10, 2008

(54) SYSTEM, METHOD AND COMPUTER PROGRAM FOR CHANGING OVER BETWEEN A VOICE TRANSMISSION AND A FAX TRANSMISSION

(75) Inventors: Thomas Baumann, Holzkirchen (DE); Karin Groetzner, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 1215 days.

(21) Appl. No.: 10/277,111

(22) Filed: Oct. 22, 2002

(65) Prior Publication Data
US 2003/0118008 A1  Jun. 26, 2003

(30) Foreign Application Priority Data
Oct. 22, 2001  (DE) ................. 011 25 073

(51) Int. Cl.
*H04L 12/66* (2006.01)
(52) U.S. Cl. ...................... 370/352; 370/360
(58) Field of Classification Search ........ 370/352–356, 370/360, 401, 492; 379/219
See application file for complete search history.

(56) References Cited

U.S. PATENT DOCUMENTS 5,533,019 A    7/1996  Jayapalan
5,764,736 A    6/1998  Shachar et al.
5,828,468 A   10/1998  Lee et al.
6,188,760 B1   2/2001  Oran et al.
6,285,466 B1   9/2001  Chimura et al.
7,139,263 B2 * 11/2006 Miller et al. ............... 370/352

OTHER PUBLICATIONS

ITU-T Telecommunication Standardization Sector of ITU Q.763 Amendment 1—Series Q: Switching and Signalling, pp. 1-6, 2001.
M. Arengo et al., "Media Gateway Control Protocol (MGCP) Version 1.0", Oct. 1999, pp. 1-135 XP015008488, Network Working Group.
Jieying Li et al., "SIP T.38 Call Flow Examples and Best Practices", Mar. 2001, pp. 1-35, Internet Engineering Task Force Internet Draft.

* cited by examiner

*Primary Examiner*—Suhan Ni
(74) *Attorney, Agent, or Firm*—Bell, Boyd & Lloyd LLP

(57) ABSTRACT

To switch back a fax transmission in line with T.38 to a voice transmission over an IP network, the invention proposes transferring the transmission data stored in the media gateway controller at a first end to the media gateway controller at a second end over a signaling network. Thereby, causing the codecs in the media gateway at the second end and the media gateway at the first end to be switched back together.

17 Claims, 11 Drawing Sheets

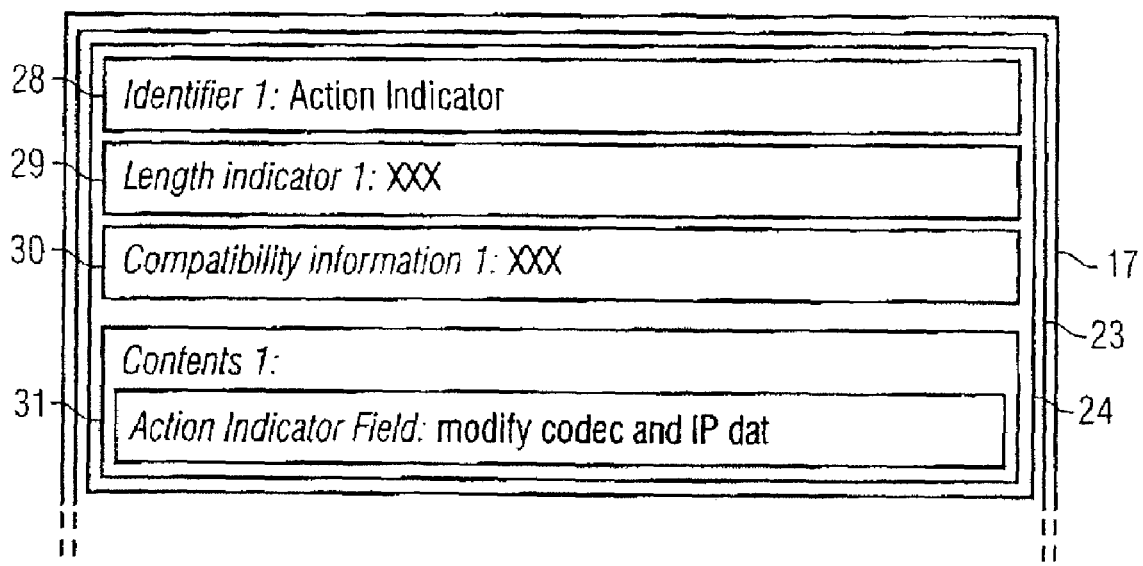
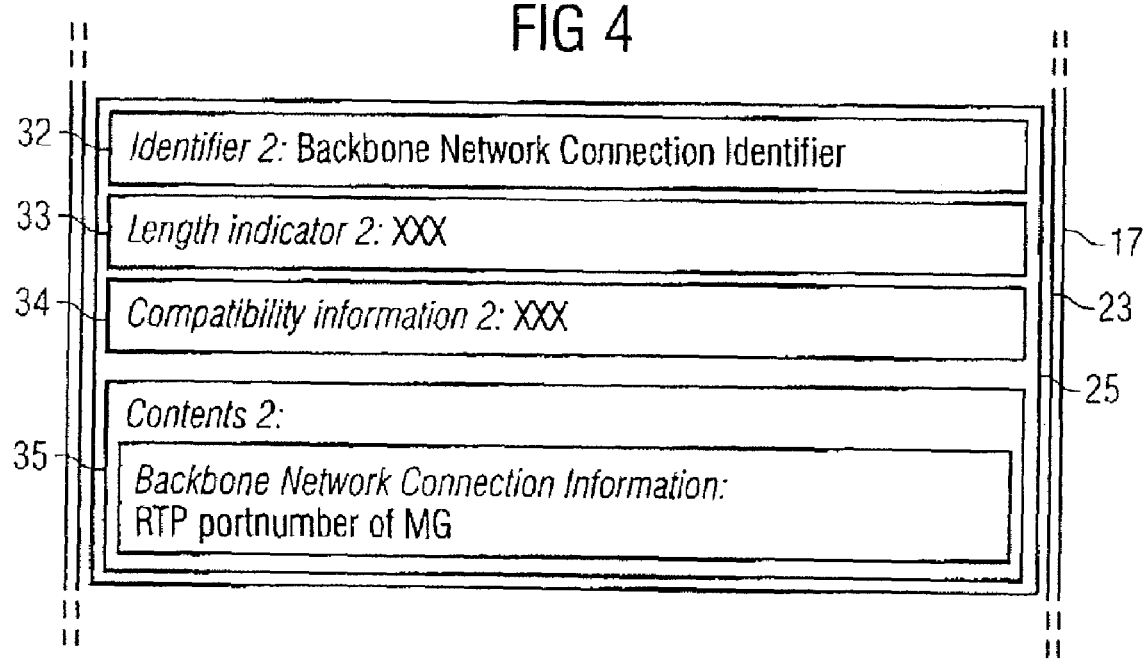

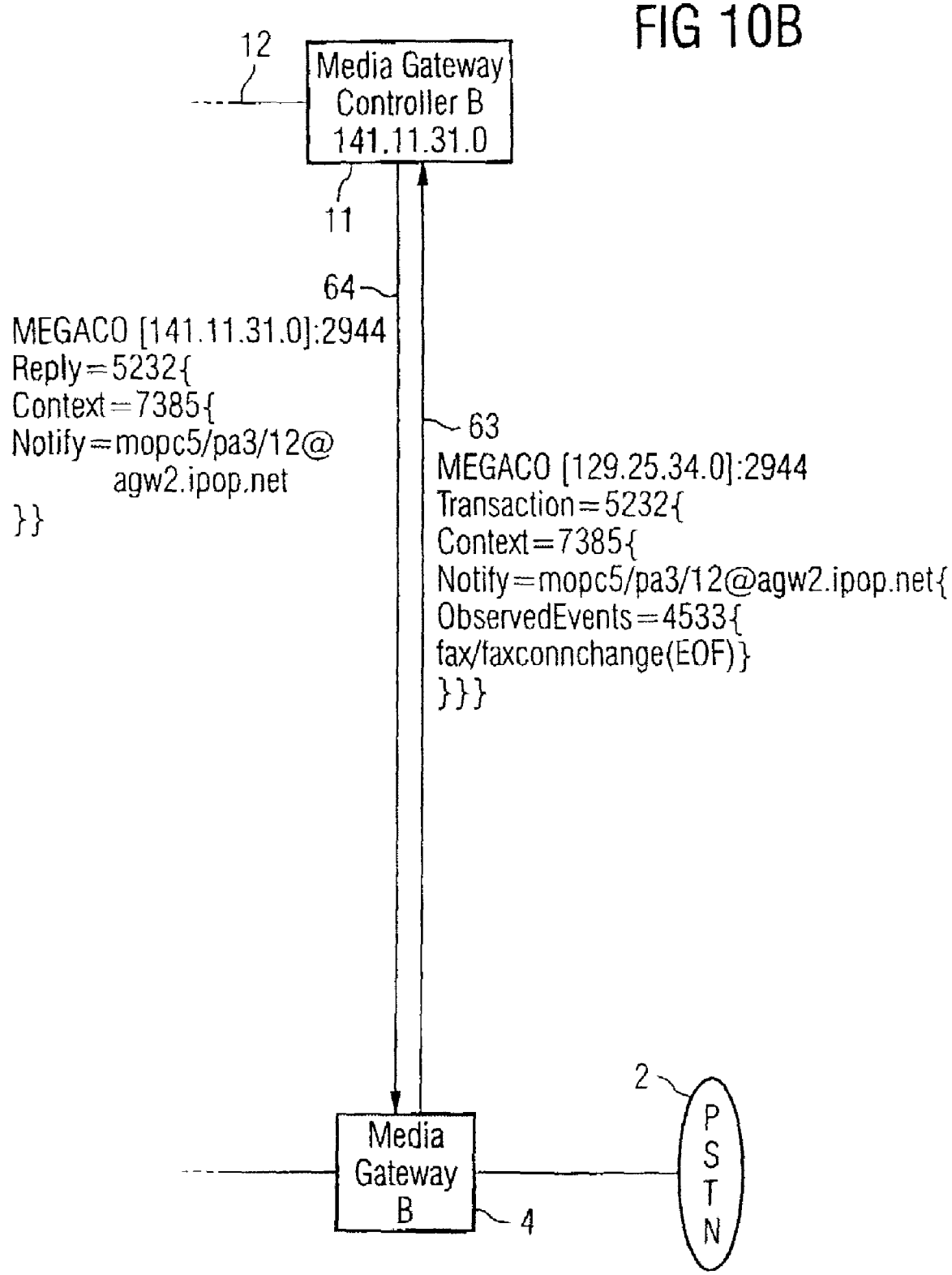

SYSTEM, METHOD AND COMPUTER PROGRAM FOR CHANGING OVER BETWEEN A VOICE TRANSMISSION AND A FAX TRANSMISSION

CLAIM FOR PRIORITY

This application claims priority to European Application No. 01125073.5 which was filed in the German language on Oct. 22, 2001.

TECHNICAL FIELD OF THE INVENTION

The invention relates to a system, method and computer program for changing over between a first transmission and a second transmission, and in particular, to a first and second transmission set up over a packet network.

BACKGROUND OF THE INVENTION

Voice and fax transmissions are currently sent using two types of communication networks: the classical, circuit-oriented telephone network used primarily for transmitting voice, and the packet-oriented data network, which is set up for transmitting data. The circuit-oriented telephone network is referred to as a circuit network for short below, and the packet-oriented data network is referred to as a packet network.

The classical circuit networks are not just used for interchanging information between the parties to a call. Instead, information relating to the control of the circuit network itself is also interchanged. This information is not necessarily passed to the parties to a call on the terminals, but rather is evaluated by the network nodes or terminals. The interchange of this information is referred to as signaling. Since defined communication paths are generally reserved for the signaling in the circuit networks, signaling networks are also referred to. In principle, the signaling for a circuit network can also take place over a packet network.

In addition, there is the tendency to also use packet networks to transmit information which are typically routed via the classical circuit network. Since the corresponding information is routed not just via the classical circuit network, but also via packet networks, heterogeneous networks are referred to in this context.

Compressive codecs cannot readily be used for fax transmissions over a packet network, since the use of compressive codecs does not ensure error-free transmission of the fax tones. Although it is possible, in principle, to use a non-compressive codec for transmitting fax transmissions over packet networks, it is necessary to ensure that pauses between the signal tones are not removed from the data stream by the codec. It is thus possible, for example, to use the non-compressive codec from G.711 to set up a fax transmission over a packet network, particularly an Internet Protocol network. However, such a fax transmission requires a bandwidth of 64 kb/sec, even though the fax transmission itself has a data rate of only 14 kb/sec. For this reason the T.38 standard has been created for fax transmissions over a packet network on the basis of the Internet Protocol.

Following the end of a fax transmission, it is occasionally necessary to switch back to a voice transmission which preceded the fax transmission. This has not been possible to date for fax transmissions over a packet network. The subscribers have had to end the fax transmission and set up the desired voice transmission again.

SUMMARY OF THE INVENTION

The invention discloses a system, method and computer program product for changing over between a first and a second transmission, allowing changes between the first and second transmissions numerous times.

In one embodiment of the invention, there is a method including, a first transmission set up between a first transmission station connecting circuit network and packet network and a second transmission station connecting packet network and circuit network, and the first transmission is changed over to a second transmission which is set up between the first transmission station and the second transmission station, and the transmission data for the first transmission are stored in at least one of the two transmission stations during the second transmission.

In another embodiment of the invention, there is a system which carries out the method. In still another embodiment, there is a computer program product which is set up for carrying out the method.

In one aspect of the invention, when the second connection has ended, the transmission stations can have access to the transmission data for the first transmission. The transmission stations are therefore able to switch back to the first transmission directly after the end of the second transmission. The method based on the invention therefore permits uninterrupted multiple changing from a first to a second transmission when changeover respectively involves storage of the data from the preceding transmission.

In one preferred embodiment of the invention, the transmission data are stored in one of the two transmission stations and are transmitted back to the respective other transmission station when switching back to the first transmission.

In another aspect of the invention, storage in one of the two transmission stations allows storage space to be saved in the transmission stations. This is advantageous since the stored transmission data are typically needed for a small number of transmissions, namely when actually switching back. The transmission data for the first transmission can be transmitted, as necessary, easily since in each case it is necessary to interchange data such as the newly allocated IP addresses or newly allocated numbers of the RTP ports used between the transmission stations.

BRIEF DESCRIPTION OF THE DRAWINGS

The invention is explained in detail below with reference to the appended drawings, in which:

FIG. 3 shows an illustration of the data structure of a first element of a message, where the second gateway controller notifies the first gateway controller of the end of the fax transmission.

FIG. 4 shows an illustration of the data structure of another element of the message, where the second media gateway controller notifies the first media gateway controller of the number of an RTP port.

FIGS. 10(a)-(d) show block diagrams showing the first part of an embodiment of the method using the Megaco protocol.

DETAILED DESCRIPTION OF THE PREFERRED EMBODIMENTS

The exemplary embodiments relate to changing over from a voice transmission to a fax transmission and switching back to the voice transmission again. In particular, switching-back to the fax transmission is illustrated in detail. It is obvious to a person skilled in the art that the considerations presented here also apply to operations involved in changing over from a fax connection to a voice connection and back to a fax connection. In addition, multiple changeover operations are also possible.

Figure 1:
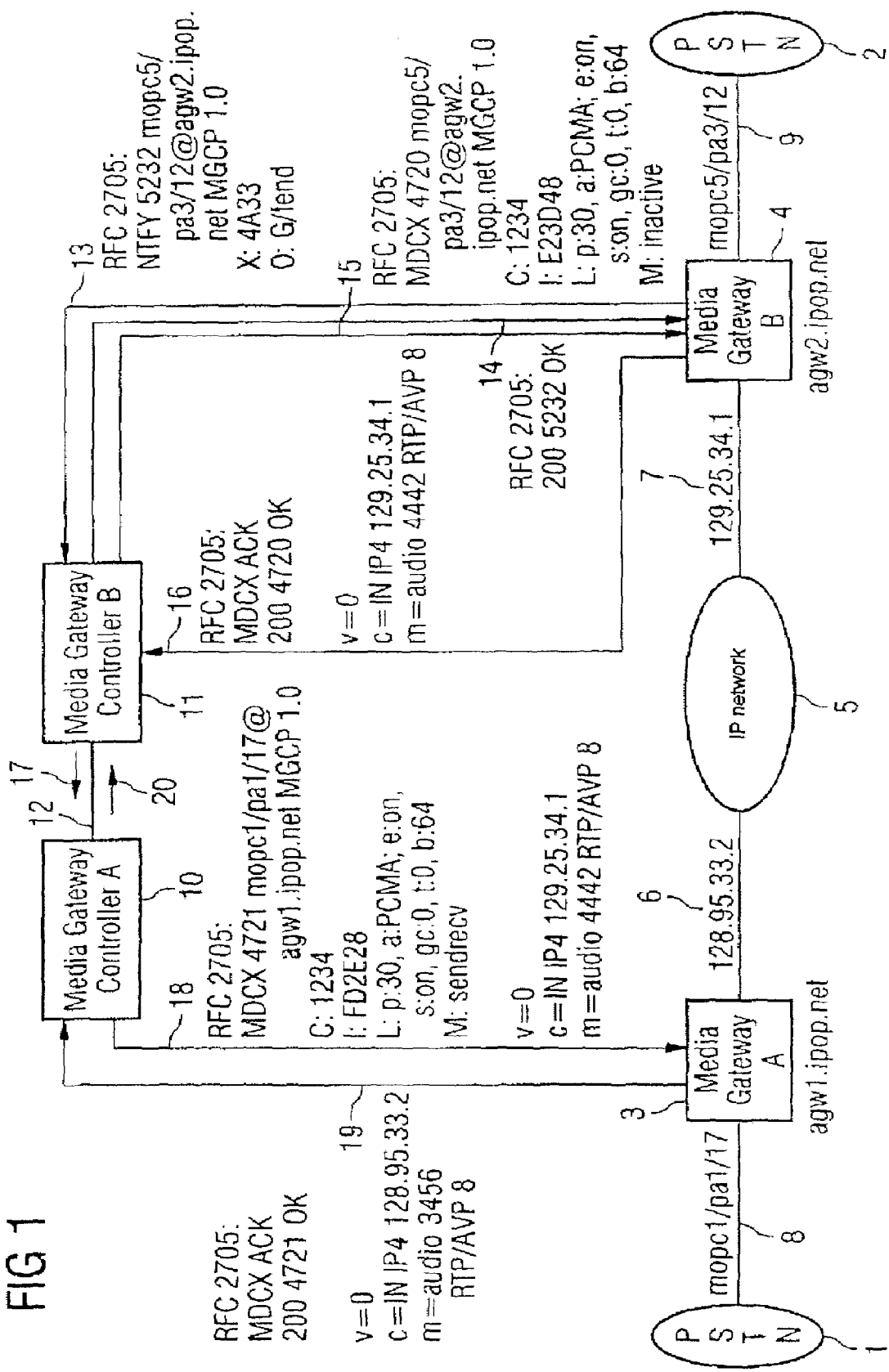
FIG. 1 shows a block diagram with a first part of the sequence of a method for switching back a fax transmission to a voice transmission.

In FIG. 1, a first circuit network 1 and a second circuit network 2 are respectively connected to an IP (Internet protocol) network 5 via a media gateway 3 at the A end and a media gateway 4 at the B end. The media gateway 3 at the A end has an IP network address GwA in the IP network, while the media gateway 4 at the B end has an IP network address GwB. The media gateways 3 and 4 allocate respective IP addresses 6 and 7 for voice transmission. The media gateways 3 and 4 are connected to the circuit networks 1 and 2 via respective PCM lines 8 and 9, which are addressed using SS7 signaling. The media gateways 3 and 4 act as converters between the circuit networks 1 and 2 and the IP network 5, since they convert the data formats of the circuit networks 1 and 2 into the data format of the IP network 5, and vice versa. The media gateways 3 and 4 are abbreviated to MG 3 and 4 below for the sake of simplicity.

The media gateways 3 and 4 have respective associated media gateway controllers 10 and 11. The media gateway controllers 10 and 11 therefore have the function of converter controllers. The media gateway controllers communicate over a signaling network 12. The signaling network 12 can be an "SS7 signaling network". The media gateway controllers 10 and 11 are abbreviated to MGC 10 and 11 below.

The MG 3 and the MGC 10 together form a transmission station which connects the IP network 5 to the circuit network 1 and is arranged at the voice transmission end referred to as the A end below.

Similarly the MG 4 and the MGC 11 together form a transmission station, which connects the IP network 5 to the circuit network 2 and is arranged at the voice transmission end referred to as the B end below.

In one embodiment, a prerequisite of the method for switching back the fax transmission is that a voice transmission over the IP network 5 initially existed between the MG 3 at the A end and the MG 4 at the B end and had then been changed over to a fax transmission in line with T.38 over the IP network 5.

The operations of changing over between voice transmission and data transmission are controlled by "connection agents". These connection agents are generally implemented in the form of software in the MGCs 10 and 11. These connection agents monitor transmission setup between the MGs 3 and 4. In particular, the connection agents also control changeover to the fax transmission and switching-back to the voice transmission. The connection agent also ensures that the appropriate MGCP commands are sent to the respective MG 3 or 4. In addition, the connection agent uses the signaling network (BICC Protocol; Q.763/Q.765.5) to communicate with the connection agent at the other end.

To switch back the fax transmission to the voice transmission again, the connection agents at the A end and the B end need to know, in accordance with MGCP standard RFC2705, "Local Connection Options", the following data for the original voice transmission:

codec for the voice connection (e.g. G.711, G.723, G.729 . . . );

bandwidth for the voice connection (e.g. 64 kbit/s for codec G.711, 5.3 or 6.3 kbit/s for codec G.723);

"packetization period" (e.g. 30 ms);

"silence suppression" (on or off);

"echo cancellation" (ON or OFF);

"type of service" (e.g. "03"; is added to the IP header of the voice RTP packets, determines the priority of the packets in the IP network); and "gain control" (e.g. 2 dB).

For the transmission data to be available to the connection agents in the MGCs 10 and 11, four basic scenarios are conceivable:

the transmission data for the preceding transmission are stored both in the MGC 10 at the A end and in the MGC 11 at the B end;

the transmission data are stored by only one of the two MGCs 10 and 11 and are communicated to the respective other MGC following the end of the fax transmission;

some of the parameters corresponding to the transmission data are permanently set in the MGC 10 at the A end and in the MGC at the B end, and the variable parameters are stored at both ends; and some of the parameters corresponding to the transmission data are permanently set in the MGC 10 at the A end and in the MGC at the B end, and the variable parameters are stored in one of the two MGCs 10 or 11 and are communicated to the respective other MGC at the end of the fax transmission.

Hybrid forms are also possible, as readily understood by the skilled artisan. By way of example, it is possible for some of the transmission data to be stored at both ends and for another portion to be stored at one end.

In the text below, it is assumed that, apart from the codecs used, the IP addresses 6 and 7 and the RTP numbers, the parameters have been permanently preset. This preferable, particularly in the case of a telephone network belonging to a national telephone company.

In addition, it is assumed that the codecs used have been buffer-stored in the second MGC 11 when changing over from the voice transmission to the fax transmission. Although the codecs used in the original voice transmission are then communicated to the MGC 10 when switching back to the fax transmission, this requires little to no additional involvement, since the IP addresses 6 and 7 allocated for the new voice transmission and also the RTP numbers need to be communicated to the MGC 10 at the A end anyway.

This is advantageous because it is possible to save storage space, since the essential information is stored.

Operation of changing over from a voice connection to a fax connection proceeds such that the MGC 11 at the B end stores the originally used codec for the voice transmission between the MG 3 at the A end and the MG 4 at the B end.

The operation of switching back is described below.

The method shown in FIG. 1 for switching back to a voice transmission involves the MG 4 at the B end sending a message 13 in line with RFC2705 (MGCP) in the form of an NTFY (Notify) message to the MGC 11 following the end of the fax transmission. In the message 13, a new parameter "fend", which has not been standardized to date, indicates the end of the fax transmission to the MGC 11 at the B end. The MGC 11 at the B end acknowledges the message 13 using a response 14 in line with RFC2705 and sends a request 15 to the MG 4 at the B end asking it to change over from the fax transmission to a voice transmission. This is done in the form of an MDCX (Modify Connection) command from RFC2705 (MGCP). The request 15 notifies the MG 4 at the B end of the codec used for the original voice transmission over the IP network 5. Thus, the entry "PCMA" in the parameter L of the request 15 means that a codec from G.711 has been used for the original voice transmission over the IP network 5.

The MG 4 at the B end replies to the request 15, following execution, with a confirmation 16 from RFC2705, in which the MG 4 at the B end notifies the MGC 11 at the B end of the IP address 7 allocated by the MG 4 at the B end and, using the entry "442" in the parameter m, of the number of the RTP port used.

The MGC 11 at the B end then sends a notification 17 over the signaling network 12 to the MGC 10 at the A end. The data structure of the notification 14 is explained in even more detail below. Before continuing, however, it will be mentioned that the notification 14 includes information about the end of the fax transmission, the IP address 7 allocated by the MG 4, the number of the RTP port and about the codec used.

Following receipt of the notification 17, the MGC 10 at the A end sends a request in the form of an MDCX (Modify Connection) command from RFC2705 (MGCP) to the MG 3 at the A end. In this case, the request 18 contains entries from the SDP (Session Description Protocol) in line with RFC2327. This part of the request 18 notifies the MG 3 at the A end of the IP address 7 allocated by the MG 4 at the B end and of the RTP port used. In addition, the entry "PCMA" in the parameter L is used to communicate that the MG 4 at the B end is using a codec from G.711.

The MG 3 at the A end then sets up a connection with the indicated parameters and reacts with a confirmation 19 in the form of an MDCX ACK (Modify Connection Acknowledgment) message from RFC2705 (MGCP), the confirmation 19 including a section in line with the SDP from RFC2327, in which the IP address 6 allocated by the MG 3 at the A end and the RTP port used and the codec used are communicated. In this case, the information about the codec in the parameter m is held in the digit "8", which indicates that the MG 3 is using a non-compressive codec from G.711.

The MGC 10 at the A end then sends a notification 20 to the MGC 11 at the B end, in which notification the IP address 6 allocated by the MGC 3 at the A end and the RTP port used are communicated to the MGC 11 at the B end. The data structure of the message 20 will be described in detail below.

Figure 2:
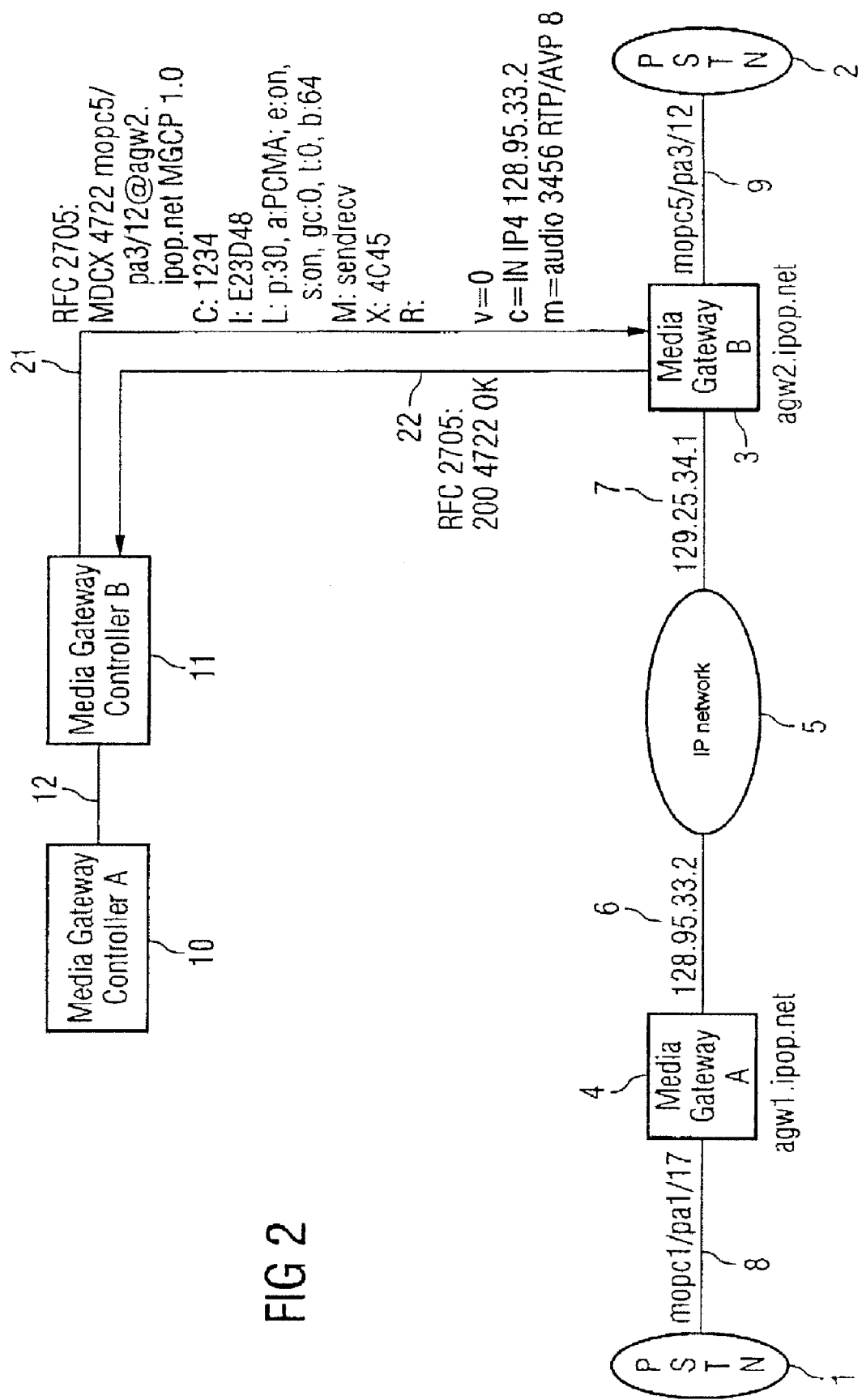
FIG. 2 shows a block diagram with a second part of the sequence of the method from FIG. 1.
Figure 5:
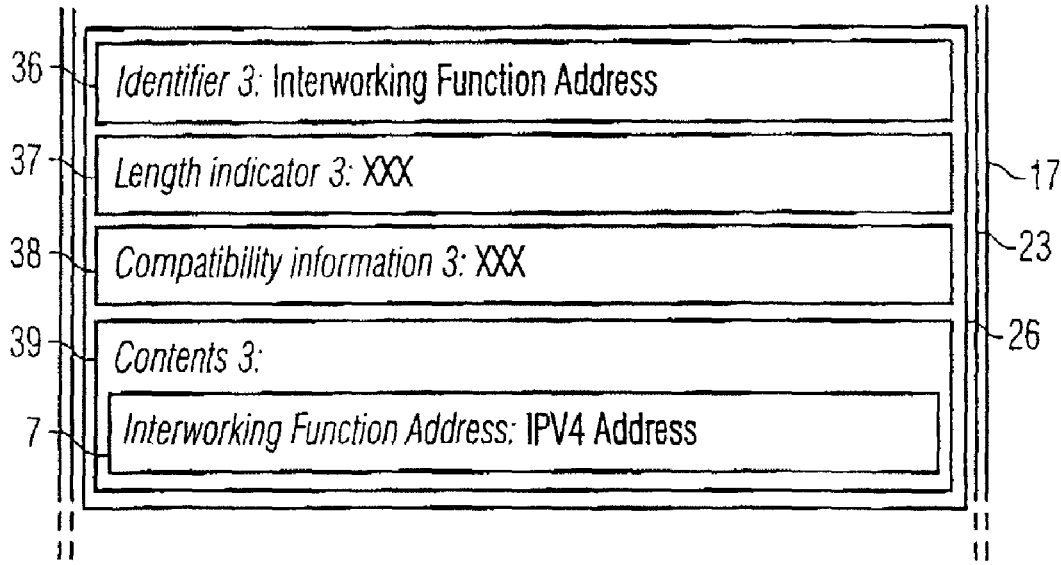
FIG. 5 shows an illustration of the data structure of a third element of the message, where the second media gateway controller notifies the first media gateway controller of an IP address.

As shown in FIG. 2, the MGC 11 at the B end reacts to the message 20 by sending a request 21 in the form of an MDCX (Modify Connection) command from RFC2705 to the MG 3 at the B end. The request 21 notifies the MG 4 at the B end of the IP address 6 allocated by the MG 3 at the A end and of the RTP port number used and of the codec used. This information is held in the parameters c and m in line with the SDP from RFC2327. The information about the codec used is additionally held in the parameter L in the entry "PCMA". The MG 3 at the B end then sets up the voice transmission with the communicated transmission data and sends a confirmation 22 to the MGC 11 at the B end.

FIGS. 3 to 6 show the data structure of information elements held in the notification 17. The notification 17 is sent using the BICC (Bearer Independent Call Control) protocol from the standard Q.765/Q.763. In particular, the information about the MG 4 at the B end is transmitted using the APP (Application Transport Parameter), which is specified within the scope of recommendation Q.763 from the ITU-T. The document ITU-T Q.763/AMD.1 (March 2001), pre-published version, contains a precise description of this parameter 23. Besides a data header (not shown in FIGS. 3 to 6), the parameter 23 includes a list of information elements 24 to 27 which are shown in detail in FIGS. 3 to 6 and whose structure is prescribed by Q.765.5.

For the information element 24 shown in FIG. 3, a first identifier 28 identifies the 'content of the information element 24' function. The information element 24 also includes a length information item 29 and a compatibility information item 30, which are followed by an action indicator field 31. The action indicator field 31 is used to indicate the end of the fax transmission to the MGC 10 at the A end and to request initiation of a changeover operation.

The information element 25 shown in FIG. 4 includes, like the information element shown in FIG. 3, an identifier 32 which identifies the function of the information element 25. The identifier 32 is in turn followed by a length information item 33 and a compatibility information item 34, which is followed by an information field 35 containing the RTP port number used by the MG 4 at the B end.

The information element 26 likewise starts with an identifier 36 identifying the function of the information element 26. This is then followed by a length information item 37 and a compatibility information item 38, which are followed by an information field containing the IP address 7 which the MG 4 at the B end has allocated for the voice transmission.

Figure 6:
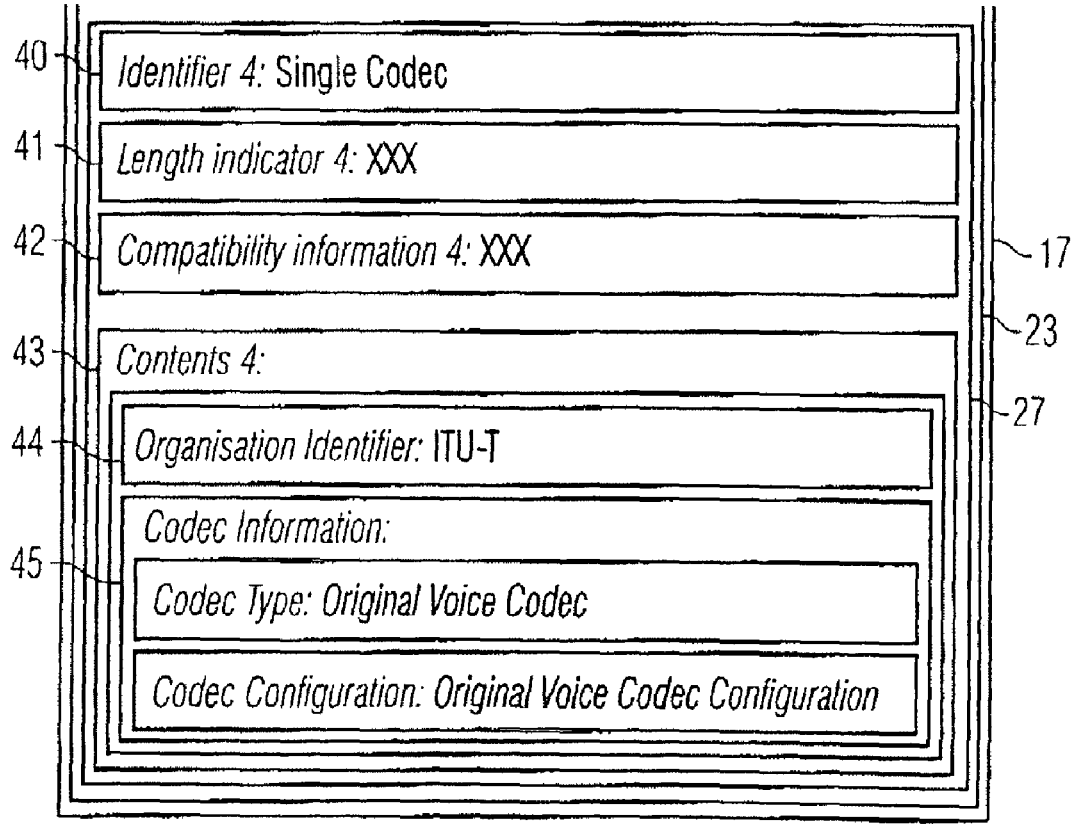
FIG. 6 shows an illustration of a fourth element of the message from the second media gateway controller to the first media gateway controller, where the codecs used by the second media gateway controller are communicated.

The information element 27 from FIG. 6 likewise comprises a first identifier 40, after which a length information item 41 and a compatibility information item 42 are arranged. The next information field 43 has a multiple structure and includes an information item 44 including the entries regarding the standardizing organization, in this case ITU-T, and a codec description which includes the type of the codec used by the MG 4 at the B end and the configuration of the codec.

Figure 7:
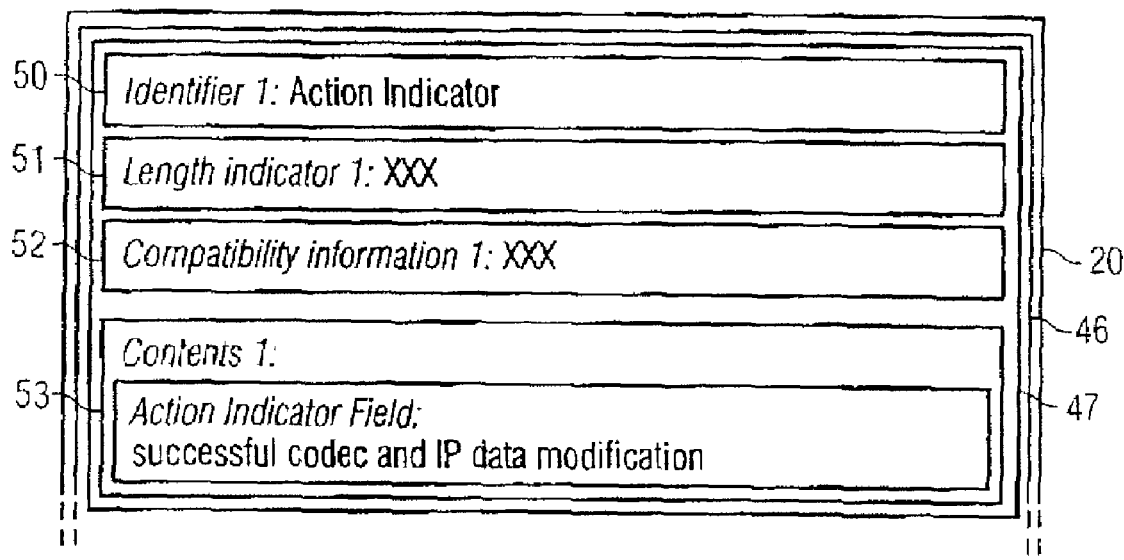
FIG. 7 shows an illustration of the data structure of a first element of a message from the first media gateway controller to the second media gateway controller, in which successful changeover is reported by the first media gateway controller.
Figure 8:
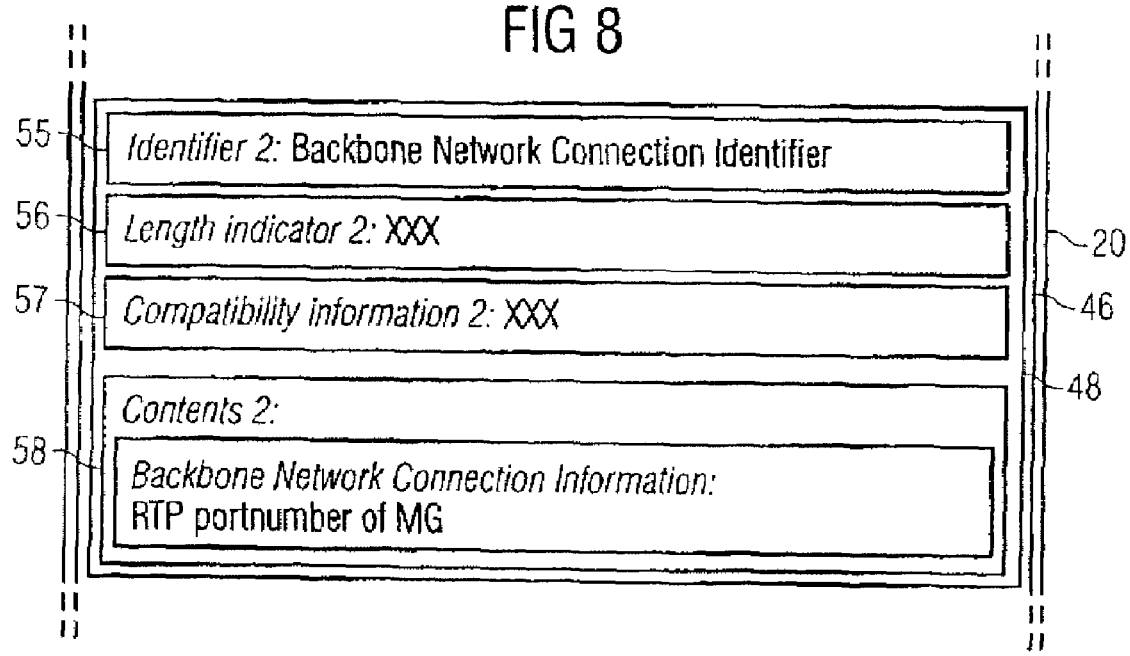
FIG. 8 shows an illustration of the data structure of another element of the message from the first media gateway controller to the second media gateway controller, where the port number used by the first media gateway is communicated.
Figure 9:
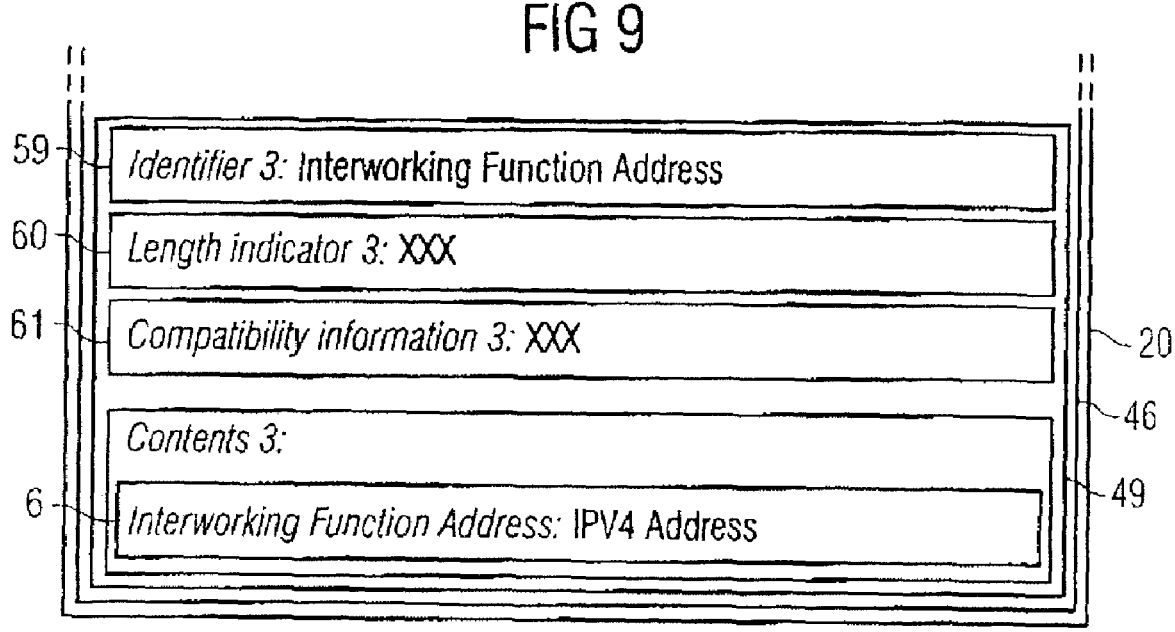
FIG. 9 shows an illustration of the data structure of a third element of a message from the first media gateway controller to the second media gateway controller, in which the IP address used by the first media gateway is communicated.

FIGS. 7 to 9 show the data structure of the notification 20. The notification 20 includes the relevant information likewise in a parameter 46 specified in Q.763, called APP. Besides a data header (not shown in FIGS. 7 to 9), this parameter 46 includes a list of information elements 47 to 49 used to communicate the transmission data for the MG 3 at the A end to the MGC 11 at the B end. The information element 47 includes an identifier 50, which is followed by a length information item 51 and a compatibility information item 52. This is followed by an information field 53 which notifies the MGC 11 at the B end that the MG 3 at the A end has switched back successfully.

The information element 46 shown in FIG. 8 also starts with an identifier 55 followed by length information 56 and compatibility information 57. Finally, an information element 58 communicates the number of the RTP ports used by the MG 3 at the A end to the MGC 11 at the B end.

Finally, besides an identifier 59, the length information 60 and the compatibility information 61, the information element 46 shown in FIG. 9 includes an information field 62 including the IP address 6 allocated by the MG 3 at the A end.

FIGS. 10(a) to (d) and 11 show another exemplary embodiment of the method, in which the communication between the media gateways 3 and 4 and the media gateway controllers 10 and 11 is conducted using the Megaco protocol specified by the IETF in RFC2885. An identical specification from the ITU-T exists, called H.248. The communication between the media gateways 3 and 4 and the media gateway controllers 10 and 11 is conducted in line with the method steps already described with reference to FIGS. 1 and 2.

FIGS. 10(a) to (d) relate to a first part of the method. In particular, FIG. 10(a) includes an overview of the method steps shown in detail in FIGS. 10(b) to (d).

In particular, the MG 4 at the B end uses a message 63 shown in FIG. 10(b) to notify the MGC 11 at the B end of the end of the fax transmission, with the Faxconnchange" event used in the Megaco protocol actually being used, with the parameter "EOF".

Figure 10A:
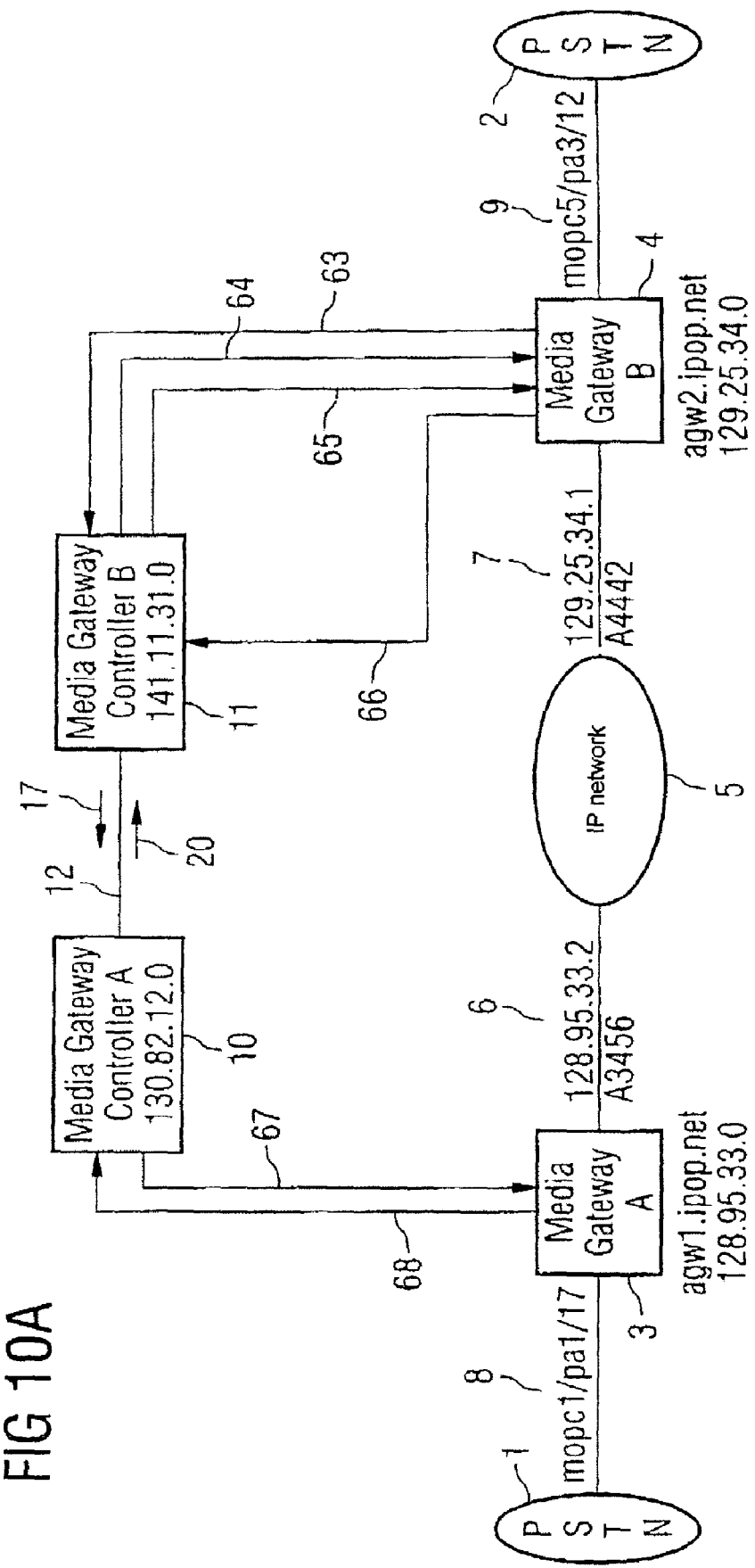
Figure 10C:
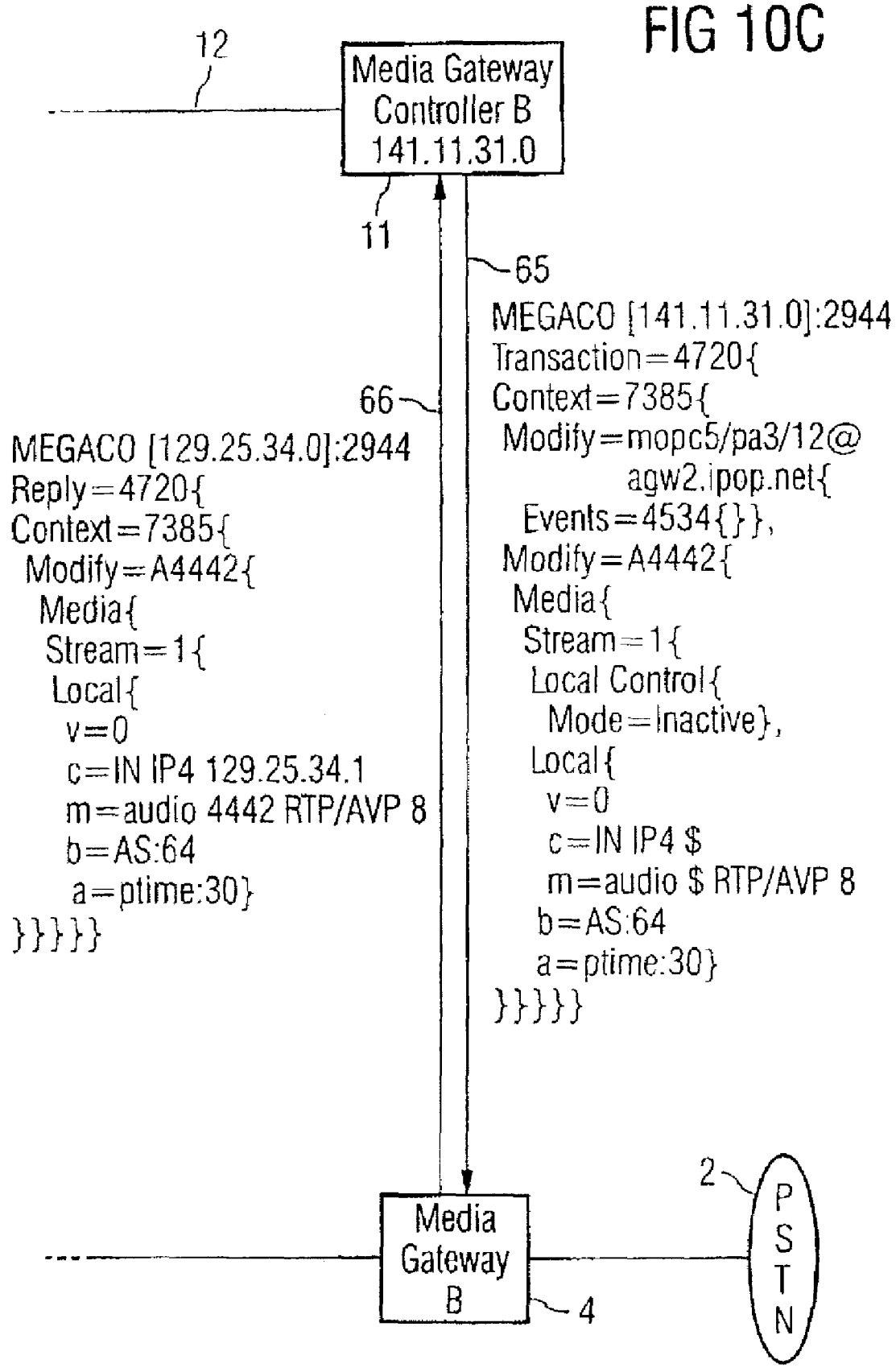

The MGC 11 at the B end then responds, in line with FIG. 10(c), with a confirmation 64 and a request 65 for the fax transmission in line with T.38 to be switched back to a voice transmission over the IP network 5. Accordingly, in the present example, the request 65 includes the command for the codec to be switched back to the payload type 8, which corresponds to a codec from G.711.

Following execution, the Modify command included in the request 65 receives a response from the MG 4 at the B end with a confirmation 66, the confirmation 66 including, in the descriptive unit called "Local", information in line with the SDP which contains the transmission data for the B end, namely the IP address 7 allocated by the MG 4 and the port used by the MG 4 at the B end.

Next, the MGC 11 at the B end sends the transparent notification 17 using the BICC protocol from Q.763/Q.765.5 to the MGC 10 at the A end.

Figure 10D:
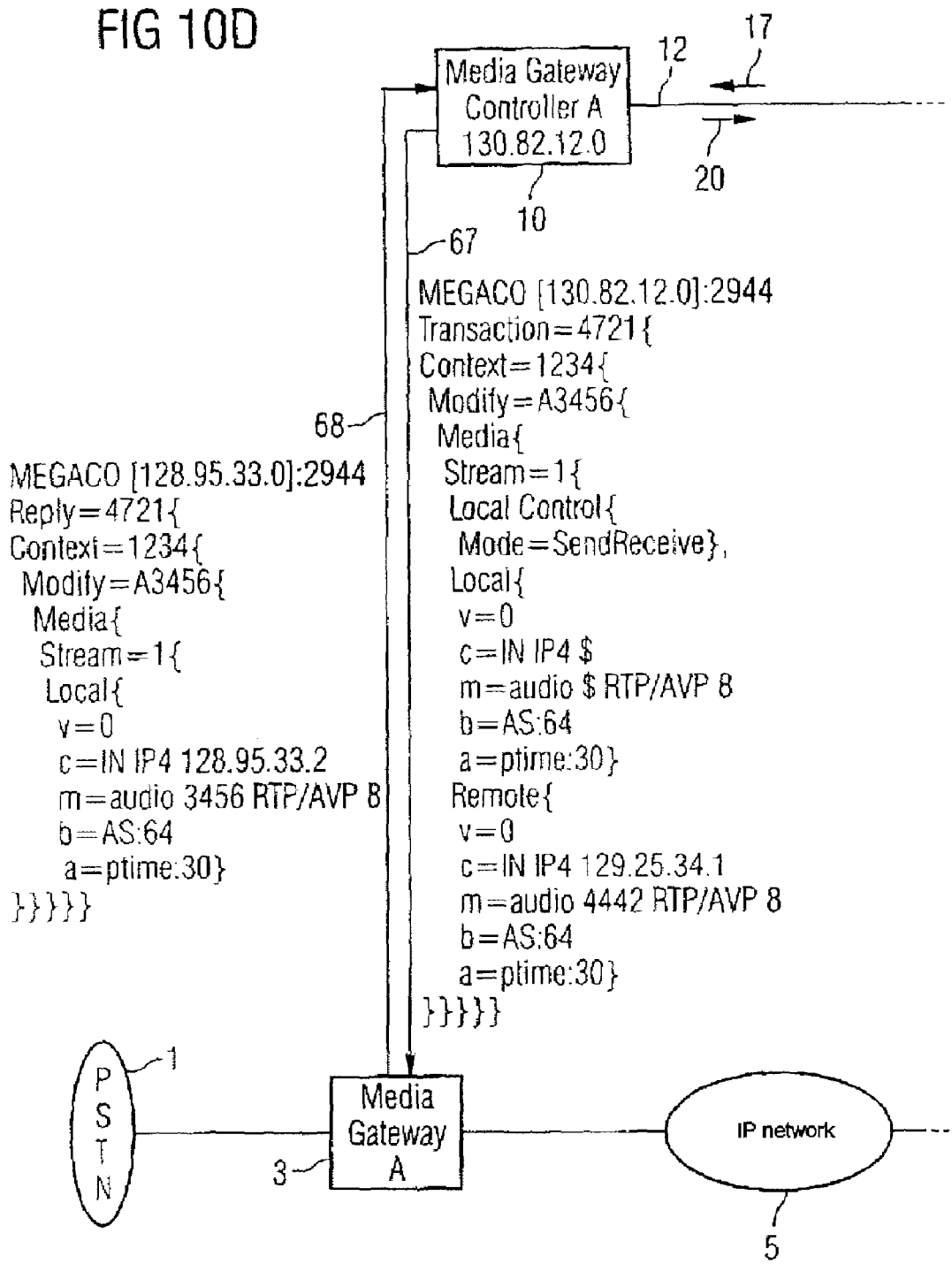
Figure 11:
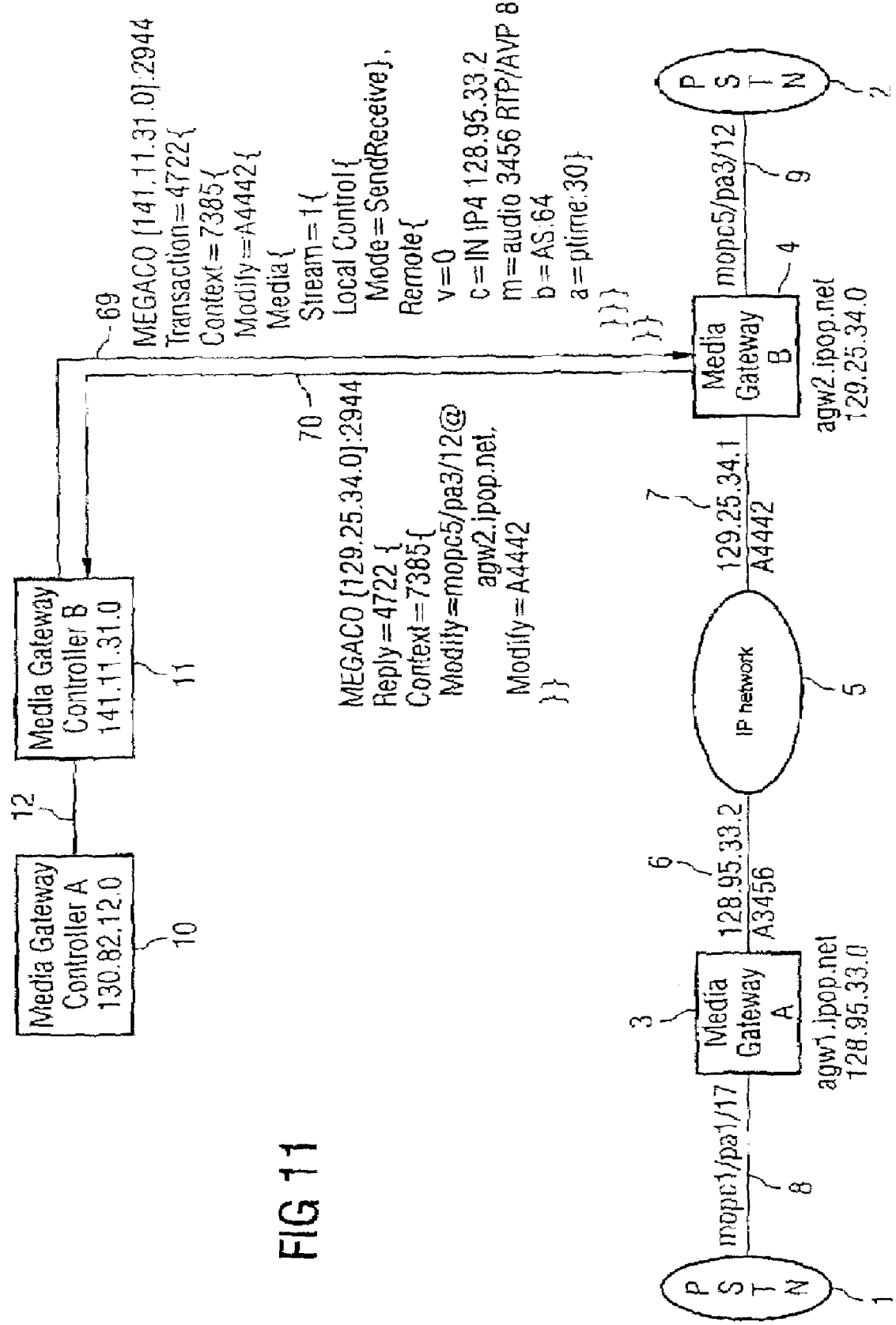
FIG. 11 shows a block diagram with the second part of the method from FIG. 10.

The MGC 10 at the A end then sends, as shown in FIG. 10d, a request 67 to the MG 3 at the A end to prompt the MG 3 at the A end to switch back to a voice transmission over the IP network 5. In this case, the MG 3 is switched back to the same codec as the MG 4. Under the descriptive unit "Remote", the request 67 includes the transmission data for the B end, particularly the IP address 7 allocated by the MG 4, and the port used by the MG 4 at the B end.

Upon the request 67, the MG 3 at the A end switches back to a voice transmission over the IP network 5. In addition, the MG 3 at the A end sends a confirmation 68 to the MGC 10 at the A end, the confirmation 68 containing the new transmission data for the A end in the descriptive unit "Local".

The MGC 10 at the A end sends the transmission data for the A end in the transparent notification 20 from Q.763/Q.765.5 to the media gateway controller 11 at the B end together with the information that the codec at the A end has been successfully switched back to the voice transmission over the IP network 5.

The MGC 11 at the B end then sends a request 69 to the MG 4 at the B end and thereby prompts the MG 4 at the B end to set up the connection finally to the MG 3 at the A end. For this purpose, the request 69 includes the transmission data for the A end under the descriptive unit "Remote".

Finally, setup of the connection is acknowledged by means of a confirmation which is sent to the MGC 11 at the B end.

In summary, the invention discloses switching back a fax transmission over a packet network to a voice transmission set up over the packet network which comprises the following:

the end of a fax transmission, set up over a packet network, between a first transmission station connecting circuit network and packet network and a second transmission station connecting circuit network and packet network is detected;

the second transmission station is switched back to a voice transmission using transmission data, stored in the second transmission station, for a voice transmission which preceded the fax transmission;

the end of the fax transmission and the stored transmission data for the voice transmission are communicated to the first transmission station using a signaling network which connects the first transmission station and the second transmission station; and the first transmission station is switched back.

This invention involves the second transmission station initiating switching-back to a voice transmission. The second transmission station uses the transmission data stored from the preceding voice transmission, which transmission data are communicated to the first transmission station over the signaling network, so that both the first and the second transmission station can be switched back to the voice transmission. Hence, the invention does not require the fax transmission to be ended finally and a new voice transmission to be set up over the packet network.

The first and second transmission stations each have MGs 3 and 4 and MGCs 10 and 11 which communicate with one another using the MGCP from RFC2705 or the Megaco protocol. The communication between the media gateway controllers is conducted using the BICC (Bearer Independent Call Control) protocol using an extended APP in line with Q.763/Q.765.5.

These exemplary embodiments afford the advantage that existing media gateways and media gateway controllers can be used and that the available standardized protocols need be changed only slightly. The invention can also be implemented in a similar way in protocols corresponding to the MGCP or Megaco standard, however.

Finally, it will be pointed out that terms such as transmission station, converter, converter controller, media gateway and media gateway controller are to be understood as having a functional meaning. These logical units do not necessarily have to form physical units, but rather can also be produced in a physical unit in the form of software or else can be distributed over a plurality of physical units.

What is claimed is:

1. A method for changing over between a first transmission and a second transmission, each of which is set up over a packet network, comprising:

setting up a first transmission between a first transmission station connecting a circuit network and the respective packet network and a second transmission station connecting the respective packet network and the circuit network;

changing over the first transmission to a second transmission which is set up between the first transmission station and the second transmission station; and storing transmission data for the first transmission in at least one of the first and second transmission stations during the second transmission.

2. The method as claimed in claim 1, wherein at least some of the transmission data are stored in one of the first and second transmission stations.

3. The method as claimed in claim 1, in which a switch back to the first transmission is made after the end of the second transmission.

4. The method as, claimed in claim 2, in which the transmission data stored in one of the first and second transmission stations are communicated to the other of the first and second transmission stations for switching back to the first transmission.

5. The method as claimed in claim 4, in which the first or second transmission station storing the transmission data asks the other of the first and second transmission stations to switch back to the first transmission.

6. The method as claimed in claim 1, using a transmission station having a first converter and a second converter, which connect the packet network and the circuit network, respectively, and the first and second converters have a first converter controller and a second converter controller associated therewith, for the first transmission station and the second transmission station, respectively.

7. The method as claimed in claim 6, in which the second converter controller is notified of an end of the second transmission.

8. The method as claimed in claim 7, in which an end of the fax transmission is communicated using a message which includes a parameter indicating the end of the fax transmission.

9. The method as claimed in claim 5, in which the second converter controller asks the second converter to switch back to the first transmission.

10. The method as claimed in claims 5, in which the second converter controller uses a signaling network to notify the first converter controller of the end of the second transmission and of the transmission data for the second converter.

11. The method as claimed in claim 10, in which the notification of the transmission data from the, second converter controller to the first converter controller comprises a parameter which includes, in addition to the transmission data, a changeover request in the form of a list of information elements.

12. The method as claimed in claim 10, in which the first converter controller asks the first converter to switch the fax transmission back to the voice transmission.

13. The method as claimed in claim 5, in which the first converter controller notifies the second converter controller of transmission data for the first converter.

14. The method as claimed in claim 13, in which the notification of the transmission data from the first converter controller to the second converter controller includes a parameter which has the transmission data in the form of a list of information elements.

15. An apparatus for converting information streams between a packet network and a circuit network, comprising:

a first transmission station connecting a circuit network and setting up a first transmission between the first transmission station and the respective packet network; and a second transmission station connecting the respective packet network and the circuit network, wherein the first transmission is changed over to a second transmission which is set up between the first transmission station and the second transmission station, and transmission data for the first transmission are stored in at least one of the first and second transmission stations during the second transmission.

16. The apparatus as claimed in claim 15, which has a converter connected to the packet network and to the circuit network and has a converter controller connected to a signaling network.

17. A computer program product for operating a transmission station between a packet network and a circuit network, having a program on a recordable medium performing the following:

setting up a first transmission between a first transmission station connecting a circuit network and the respective packet network and a second transmission station connecting the respective packet network and the circuit network;

changing over the first transmission to a second transmission which is set up between the first transmission station and the second transmission station; and storing transmission data for the first transmission in at least one of the first and second transmission stations during the second transmission.

* * * * *